Jan. 13, 1925.
J. L. WILSON
1,523,327
WASHER PLACING APPARATUS
Filed April 24, 1924
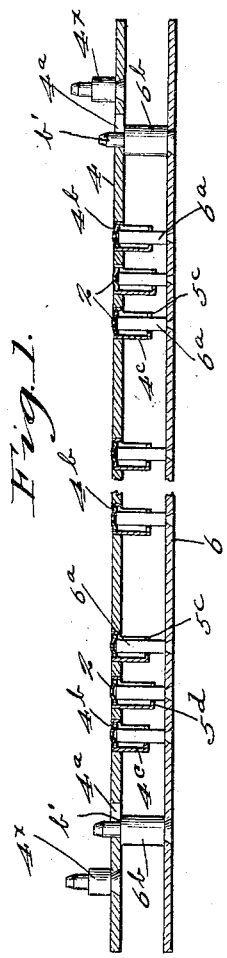
Inventor
John L. Wilson
By *Spear Middleton Donaldson & Hall*
Attorney Patented Jan. 13, 1925.

1,523,327

UNITED STATES PATENT OFFICE.

JOHN L. WILSON, OF KENMORE, OHIO, ASSIGNOR TO THE MILLER RUBBER COMPANY, OF AKRON, OHIO, A CORPORATION OF OHIO.

WASHER-PLACING APPARATUS.

Application filed April 24, 1924. Serial No. 708,826.

*To all whom it may concern:*

Be it known that I, JOHN L. WILSON, a citizen of the United States, and resident of Kenmore, in the county of Summit and State of Ohio, have invented certain new and useful Improvements in Washer-Placing Apparatus, of which the following is a specification.

My present invention relates to improvements in devices for placing washers on the pins of heel molds preparatory to their being incorporated or embedded in the rubber heel, or heels, during the molding or vulcanizing thereof.

The invention aims to provide a simple and economical form of apparatus by which the washers may be expeditiously handled and accurately placed on the pins, and it comprises the novel features of construction and arrangement and combination of parts hereinafter described, and particularly defined by the appended claims.

An embodiment of my invention is illustrated in the accompanying drawing, in which:—

Figure 1 is a longitudinal sectional view showing the parts of the device assembled for washer segregating purposes.

Fig. 2 is a similar view with the plate carrying the washer supporting pins removed, and the plate or member carrying the washer holding plungers applied to the segregating device.

Fig. 3 is a similar view showing the parts illustrated in Fig. 2 in connection with the heel mold.

Referring by reference characters to this drawing, the numeral 1 designates the lower section of the heel mold having the customary upstanding pins $1^a$ to receive the washers 2, which, as shown, are of somewhat dished form, or provided with an annular deflected portion adjacent the washer opening.

These molds are provided with dowel pins 3 for properly aligning the washer-placing device, as hereinafter described. While I have shown the invention as embodied in a device for applying the washers to a mold having a plurality of mold recesses or cavities, it will be readily understood that it may, with equal facility, be made to conform to a mold having one or any desired number of such mold recesses.

The numeral 4 designates what I may term a washer-segregating plate or tray, and it is provided with holes $4^a$ designed to receive the dowel pins 3 and other holes $4^b$ corresponding in number and position to the pins $1^a$ of the mold.

These holes $4^b$ have located and firmly secured therein, washer-holding means which preferably take the form of bushings $4^c$ having cylindrical or circular upper ends secured in the openings of the plate 4 and flush with the upper surface thereof, each bushing below the plate 4 being cut away at one side to make it approximately semi-circular in shape, and leave that side open, and being provided with an inwardly extending ledge or flange $5^d$ of similar shape.

The opposite side of the bushing is milled or cut away to provide a slotted opening $5^e$. The inside diameter of the bushing is of such a size that a washer can pass therethrough until it rests on the internal flange at the bottom, from which it may be removed by a lateral movement, as hereinafter described.

To enable this plate 4 to be used as a washer-segregating device, I provide a cooperating element 6 (shown as a plate, though it might be a skeleton frame) having upstanding pins $6^a$ corresponding in number and position to the bushings and having dowels $6^b$ positioned to engage the openings $4^a$. The pins $6^a$ are of a size to enter the lower ends of the bushing and of a length to enter the openings $4^b$, or, in other words, the upper ends of the pins are arranged, when the plates are assembled as shown in Fig. 1, to have their upper ends centrally located within the ring-shaped upper ends of the bushings with the tops of the pins slightly below the upper surface of the plate 4, being held in this position by the shoulders $b'$ of the dowels $6^b$ bearing against the under face of the plate 4. With the parts in this position, if a plurality of washers are placed promiscuously on the upper surface of the plate 4 and the latter shaken (by hand or any suitable mechanism) washers sliding over the surface of the plate will lodge in the cavities formed by the depressed ends of the pins and be supported therein by said pins, provided the concave side of the washer is lowermost. If the washer is inverted, however, it will slide across the cavity, as will be apparent from the drawing. After the cavities are all filled by the shaking motion, the plate may be inclined to cause the surplus washers to slide therefrom into any suitable receiver. The plate 4 may now be lifted away from the plate 6 and the pins 6ª withdrawn, allowing the washers to drop down into the bushings until they rest on the flanges at the bottom thereof, as shown in Fig. 2. The plate 4 could then, by careful manipulation, be used to place the washers on the mold pins, by superposing it on the mold plate in proper alignment. As, however, the device in use would be likely to be shaken, or possibly bumped or jarred, which might result in dislodging the washers from their seats on the flanges, I provide means for preventing such accidental displacement, which takes the form of a member 7, conveniently of plate-like form, having dowel openings 7ª designed to receive the reduced upper ends of dowels 4ˣ fast on plate 4. Said plate 7 carries a plurality of spring pressed plungers 8 preferably slidably guided in openings in the plate 7, and acted on by compression springs 9 encircling the plungers between the plate 7 and the plunger heads, which heads are preferably provided with conical or rounded end faces to impinge against the convex faces of the washers. The plungers are grouped to correspond in position to the bushings 4ᶜ and are of such length that when plate 7 is positioned as shown in Fig. 2, and held with the springs compressed by means such as clips indicated at 10, the lower ends of the plungers will be spring pressed against the washers, thereby firmly holding them against displacement, as shown in said Fig. 2.

The assembled plates 4 and 6 may now be manipulated without danger of displacing the washers from their seats (flanges 5ᵈ) and assembled in proper relation to the mold by entering the mold dowels 3 in the dowel openings 4ª, as shown in Fig. 3.

If plates 4 and 7 are now moved in a lateral direction, as a unit, relative to the mold (direction of the arrow, Fig. 3), the engagement of the mold pins with the washers will withdraw the latter from the open sides of bushings 4ᶜ (these open sides all facing in the same direction) against the resistance of the yieldable plungers.

For this purpose the openings 4ª are made in the form of elongated slots, it being understood that plate 4 is applied to the mold with the pins at the left hand ends of the slots, as shown in Fig. 3.

It will be obvious that the elements 4ᶜ might be made integral with the plate 4, but for convenience of manufacture, I prefer to make them in the form of bushings, as above described. It will be understood that the elements 4 and 7 are made rectangular in shape to conform to the shape of the heel mold, and four dowels are provided at the respective corners for properly aligning the elements.

Having thus described my invention, what I claim is:—

1. A washer-placing device comprising a plate-like member, a group of hollow washer holders carried thereby and depending therefrom, said holders having laterally open sides and inwardly extending washer-supporting ledges at their lower ends, and washer-supporting means collectively insertible through said bushings, and having washer-engaging faces adapted to be positioned slightly below the upper face of the said plate-like member.

2. In combination, a washer-segregating plate, a group of hollow washer holders carried thereby having their upper ends substantially flush with the upper surface of said plate, said holders depending from said plate and having internal washer-supporting ledges and lateral washer exit openings adjacent said ledges, and a supporting member having upstanding pins positioned to be inserted through the lower ends of said washer holders, and have their upper ends lie adjacent the upper ends of said washer holders.

3. In combination, a washer-segregating plate, a group of hollow washer holders carried thereby having their upper ends substantially flush with the upper surface of said plate, said holders depending from said plate and having internal washer-supporting ledges and lateral washer exit openings adjacent said ledges, and a supporting member having upstanding pins positioned to be inserted through the lower ends of said washer holders, and have their upper ends lie adjacent the upper ends of said washer holders, and means for holding said washer-segregating plate and said supporting member with the pins centrally located in said washer holders.

4. In combination, a washer-segregating plate, a group of hollow washer holders carried thereby having their upper ends substantially flush with the upper face of said plate, said washer holders depending from the lower face of said plate and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, and means whereby said segregating plate may be accurately positioned in relation to a heel mold to cause the mold pins to engage the washers and thereafter given a lateral movement relative thereto.

5. In combination, a washer-segregating plate, a group of hollow washer holders carried thereby having their upper ends substantially flush with the upper face of said plate, said washer holders depending from the lower face of said plate, and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, said segregating plate having elongated openings for engaging the customary heel mold dowel pins.

6. In combination, a washer-segregating plate, a group of hollow washer holders carried thereby having their upper ends substantially flush with the upper face of said plate, said washer holders depending from the lower face of said plate, and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, and means for clamping said washers against said ledges.

7. In combination, a washer-segregating plate, a group of hollow washer holders carried thereby having their upper ends substantially flush with the upper face of said plate, said washer holders depending from the lower face of said plate, and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, and yielding means for pressing said washers against said ledges.

8. In combination, a washer-segregating plate, a group of hollow washer holders carried thereby having their upper ends substantially flush with the upper face of said plate, said washer holders depending from the lower face of said plate, and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, and means for clamping said washers against said ledges, said means comprising a carrying member having a plurality of spring plungers positioned to correspond to said washer holders.

9. In combination, a washer-segregating plate, a group of hollow washer holders carried thereby having their upper ends substantially flush with the upper face of said plate, said washer holders depending from the lower face of said plate, and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, and means for clamping said washers against said ledges, said means comprising a carrying member having a plurality of spring plungers positioned to correspond to said washer holders, and means for enabling said carrying member to be accurately positioned relative to said segregating plate.

10. In combination, a washer-segregating plate, a group of hollow washer holders carried thereby having their upper ends substantially flush with the upper face of said plate, said washer holders depending from the lower face of said plate, and having washer-supporting ledges and laterally extending washer exit openings, means insertible in said washer holders and cooperating with the upper ends of the washer holders to form washer-receiving seats or pockets, said means being removable to permit the segregated washers to drop onto said ledges, and means for clamping said washers against said ledges, said means comprising a carrying member having a plurality of spring plungers positioned to correspond to said washer holders, and means for temporarily securing said carrying member to said segregating plate in determined relation thereto.

In testimony whereof, I affix my signature.

JOHN L. WILSON.